United States Patent [19]
Takahashi et al.

[11] Patent Number: 6,119,483
[45] Date of Patent: Sep. 19, 2000

[54] PROCESS FOR PRODUCING GLASS SUBSTRATE FOR INFORMATION RECORDING MEDIUM

[75] Inventors: Koji Takahashi; Kazuhiko Maeda, both of Yamanashi; Shinji Eda, Narasaki; Jun Ozawa, Kofu; Katsutoshi Ōno, Yamanashi; Kinobu Osakabe, Akishima; Nobuyuki Etō, Yamanashi, all of Japan

[73] Assignee: Hoya Corporation, Tokyo, Japan

[21] Appl. No.: 08/999,479

[22] Filed: Dec. 29, 1997

[30] Foreign Application Priority Data

Dec. 30, 1996 [JP] Japan .................................. 8-357543
Dec. 30, 1996 [JP] Japan .................................. 8-357544
Dec. 30, 1996 [JP] Japan .................................. 8-357545
Feb. 9, 1997 [JP] Japan .................................. 9-041513

[51] Int. Cl.⁷ .................................................. C03C 21/00
[52] U.S. Cl. ........................ 65/30.14; 65/60.5; 65/65.53; 65/61
[58] Field of Search ....................... 65/30.13, 30.14, 65/60.5, 60.53, 61; 134/3, 104.1, 104.4, 110

[56] References Cited

U.S. PATENT DOCUMENTS

| | | | |
|---|---|---|---|
| 3,661,545 | 5/1972 | Bartholomew | 65/30.14 |
| 3,773,489 | 11/1973 | Forker, Jr. et al. | 65/30.14 |
| 5,654,057 | 8/1997 | Kitayama et al. | 428/64.1 |
| 5,705,273 | 1/1998 | Denry et al. | 428/410 |

FOREIGN PATENT DOCUMENTS 2-285508 11/1990 Japan .
7-191529 7/1995 Japan .

*Primary Examiner*—Sean Vincent
*Attorney, Agent, or Firm*—Frishauf, Holtz, Goodman, Langer & Chick, P.C.

[57] ABSTRACT

An object of the present invention is to prevent the dhesion of particles such as fine iron powders onto a glass substrate upon the production of a glass substrate for an information recording medium. To attain the above object, any one of the following means is adopted: (1) at least one of the production, inspection, packing and filling steps of the glass substrate for an information recording medium is carried out under a clean atmosphere which does not permit the adhesion of particles; (2) at least a wall surface of a chemical reinforcement tank containing a chemical reinforcement liquid therein and/or said retaining means which is contact with the chemical reinforcement liquid is formed of a stainless alloy having corrosion resistance in a high-temperature region as high as the heating temperature of the chemical reinforcement liquid; (3) a means for trapping fine particles existing in the chemical reinforcement liquid used in the chemical reinforcement step is provided; and (4) the glass substrate is washed with hydrochloric acid.

16 Claims, No Drawings

PROCESS FOR PRODUCING GLASS SUBSTRATE FOR INFORMATION RECORDING MEDIUM

REFERENCE TO RELATED APPLICATION

This application claims the priority right of Japanese Patent Application Nos. HEI 08-357543 filed on Dec. 20, 1996, HEI 08-357544 filed on Dec. 30, 1996, HEI 08-357545 filed on Dec. 30, 1996 and HEI 09-41513 filed on Feb. 9, 1997, the entire disclosure of which is incorporated herein by reference.

BACKGROUND OF THE INVENTION

1. Field of the Invention

The present invention relates to a process for producing an information recording medium used as a recording medium of an information processing apparatus and also a process for producing a substrate employed for the medium.

2. Description of the Related Art

One of such information recording mediums is a magnetic disk. The magnetic disk is produced by forming a thin film such as a magnetic layer on a substrate and as the substrate for it, an aluminum or glass substrate has been employed. Reflecting the recent pursuit of high recording densification, a glass substrate which makes it possible to decrease a distance between a magnetic head and a magnetic recording medium has come to be more prevalent compared with an aluminum substrate.

The glass substrate showing such an increasing tendency is, in general, subjected to chemical reinforcement for heightening its strength so that it can endure the impact upon mounting on a magnetic disk driver. The surface of the glass substrate is polished with high accuracy so that the flying height of the magnetic head can be lowered to the utmost, whereby the high recording densification is actualized.

As well as the improvement in the glass substrate, a magnetic head has been changed from a thin-film head to a magnetoresistive type head (MR head) to meet the tendency to high recording densification.

As described above, high evenness on the surface of a magnetic disk is indispensable for the flying height reduction to heighten the recording density. In addition, when an MR head is employed, high flatness on the surface of a magnetic recording medium is also required in order to prevent the generation of TA (thermal asperity). The term "thermal asperity" as used herein means a phenomenon that a projection existing on the surface of a magnetic disk affects an MR head to generate heat, thereby causing fluctuations in the resistance of the head and causing a malfunction in the electromagnetic conversion.

There is an increasing demand for a magnetic disk having high evenness for both the lowering of flying height and prevention of occurrence of thermal asperity. A substrate having a highly even surface is eventually required for a magnetic disk having a surface of high evenness, but the requirement for heightening of the recording density exceeds the level which can be materialized by only polishing the surface of the substrate with high accuracy. In other words, it is impossible to attain high evenness even by polishing with high accuracy if foreign matters adhere onto the substrate. The removal of foreign matters has been carried out conventionally but the conventional tolerance of foreign matters on the substrate is now regarded as inadequate for the recent tendency to heighten the recent densification level.

Examples of such foreign matters include considerably fine iron powders, stainless pieces, glass chips and organic substance which cannot be removed by ordinary washing. When a thin film such as magnetic film is stacked on a glass substrate without removing the particles such as iron powders from the glass substrate, a protrusion is formed on the surface of a magnetic disk, which becomes a cause for disturbing the lowering in the flying height or prevention of thermal asperity.

SUMMARY OF THE INVENTION

An object of the present invention is to prevent the adhesion of particles such as fine iron powders to a glass substrate. Another object of the present invention is to produce an information recording medium in a high yield by using a glass substrate from which foreign matters to be a cause for under-layer defects have been removed.

The present inventors have conducted an extensive investigation on the cause of the adhesion of the particles such as fine iron powders to a glass substrate. As a result, it has been found that a metal such as iron powders or metal oxide generated from manufacturing facilities or buildings is floating in an atmosphere surrounding a chemical reinforcement apparatus and such a floating substance is mixed in a chemical reinforcement solution and adheres to the glass substrate.

In one aspect of the present invention, there is thus provided a process for producing a glass substrate for an information recording medium, which comprises a step of polishing a principal surface of a glass substrate and a step of chemically reinforcing said glass substrate (said step may hereinafter be called "chemical reinforcement step") by bringing it into contact with a chemical reinforcement liquid to substitute a portion of ions contained in said glass substrate by ions having a diameter larger than the former ions in said chemical reinforcement liquid, wherein at least one of the steps subsequent to a final polishing step, that is, washing step, said chemical reinforcement step, step of washing off said chemical reinforcement liquid, drying step, inspection step, and a step of packing said glass substrate or filling the same in a container is effected in an atmosphere where clean filtered air is circulated so as to prevent the adhesion of particles to said glass substrate.

In a second aspect of the present invention, there is also provided a process for producing a glass substrate for an information recording medium, which comprises a step of polishing a principal surface of a glass substrate; and a step of chemically reinforcing said glass substrate by bringing it into contact with a chemical reinforcement liquid to substitute a portion of ions contained in said glass substrate by ions having a diameter larger than the former ions in said chemical reinforcement liquid, thereby reinforcing said glass substrate, wherein at least one of the steps subsequent to a final polishing step, that is, a washing step, said chemical reinforcement step, a step of washing off said chemical reinforcement liquid, a drying step, an inspection step, and a step of packing said glass substrate or filling the same in a container is effected under an environment whose air cleanliness permits the existence of particles having a size of 0.3 to 100 µm in an amount not more than 1000 particles per cubic feet·meter of the air.

In a third aspect of the present invention, there is also provided a process for producing a glass substrate for an information recording medium as described in the first aspect, wherein the clean filtered air has cleanliness permitting the existence of particles having a size of 0.3 to 100 µm in an amount not more than 1000 particles per cubic feet·meter of the air.

In a fourth aspect of the present invention, there is also provided a process for producing a glass substrate for an information recording medium as described in the first or second aspect, wherein the air has cleanliness permitting the existence of particles in an amount not more than 100 particles per cubic feet·meter of the air.

In a fifth aspect of the present invention, there is also provided a process for producing a glass substrate for an information recording medium as described in the first or second aspect, wherein the air has cleanliness permitting the existence of particles in an amount not more than 50 cubic feet·meter of the air.

In a sixth aspect of the present invention, there is also provided a process for producing a glass substrate for an information recording medium as described in the first or second aspect, wherein the washing and chemical reinforcement of the glass substrate subsequent to the final polishing step are effected under an environment whose air cleanliness permits the existence of particles in a prescribed amount in the air.

Examples of the particles to be removed in the present invention include metal pieces such as fine iron powders, metal oxide pieces, glass chips, oil mist, silicon dust, fibers and organic substance. Particles large enough to cause inferiority during the use of an information recording medium or in the production step are removed. The size of the particles to be removed preferably ranges from 0.3 micron to 100 microns, but control to a size within a range of from 1 micron to 100 microns also brings about effects. Even the control of the size to 10 to 100 microns does not cause problems in the practical use.

The steps subsequent to the final polishing such as washing, chemical reinforcement treatment, washing-off of the chemical reinforcement solution, drying, inspection, or packing of the glass substrate may be carried out after covering, with a dust-tight cloth, a part of the manufacturing facilities or buildings which possibly generate dust; or may be carried out in a room having cleanliness controlled to a predetermined degree by a clean booth method or clean room method, in order to reduce the particles, thereby heightening cleanliness.

The step of reducing particles to heighten the cleanliness may be carried out at least one of the steps subsequent to the final polishing such as washing, chemical reinforcement treatment, washing-off of the chemical reinforcement solution, drying, inspection and packing of the glass substrate, but it is desired to carry out this step for heightening the cleanliness in all of these steps. It is particularly effective to reduce the particles, thereby improving cleanliness during the final polishing step to the chemical reinforcement step, because when particles have adhered to the glass substrate during the chemical reinforcement step, a portion of the glass substrate on which the particles exist is not chemically reinforced or particles on the glass substrate firmly adhere to the glass substrate due to the chemically reinforced salt and cannot be removed easily by the subsequent washing step. Accordingly, it is markedly important to maintain the cleanliness of the glass substrate during the chemical reinforcement step or the step therebefore.

The present inventors have carried out a further extensive investigation on the cause of the adhesion of the fine iron powders to a glass substrate. As a result, it has been found that when the glass substrate is immersed in a chemical reinforcement tank containing a chemical reinforcement solution therein or a chemical reinforcement solution, a metal such as iron powders or a metal oxide adheres to the glass substrate directly or through the chemical reinforcement solution from a retaining means for retaining the glass substrate. It has also been found that since the chemical reinforcement treatment is effected at a high temperature (ex. 350 to 450° C.), a chemically reinforced glass substrate having a clean surface cannot be obtained unless a specific stainless alloy is used.

In a seventh aspect of the present invention, there is therefore provided a process for producing a glass substrate for an information recording medium, which comprises a step of chemically reinforcing a glass substrate, which has been retained by a retaining means, by bringing its into contact with a chemical reinforcement liquid to substitute a portion of ions contained in said glass substrate by ions having a diameter larger than the former ions in said chemical reinforcement liquid, wherein at least a wall surface of a chemical reinforcement tank containing said chemical reinforcement liquid therein and/or said retaining means for retaining said glass substrate which is in contact with said chemical reinforcement liquid is formed of a stainless alloy having corrosion resistance in a high-temperature region as high as the heating temperature of said chemical reinforcement liquid.

In an eighth aspect of the present invention, there is also provided a process for producing a glass substrate for an information recording medium as described in the seventh aspect, wherein said stainless alloy is a martensitic or austenitic stainless alloy.

Various shapes of retaining means can be considered as those for the glass substrate. In short, preferred is a retaining means shaped to make it possible to bring the glass substrate into contact with the chemical reinforcement solution under a predetermined condition and not to cause liquid sagging.

It is preferred to form both the chemical reinforcement tank and retaining means for the glass substrate from a martensitic or austenitic stainless alloy, but it is also possible to form either of them from such an alloy. Moreover, it is preferred to form the whole portion of the chemical reinforcement tank or of the retaining means for the glass substrate from a martensitic or austenitic stainless alloy, but it is possible to form only a portion which is brought into contact with the chemical reinforcement solution from such an alloy.

The martensitic or austenitic stainless alloy has excellent corrosion resistance in a high temperature region so that it prevents the generation of dust from metallic pieces. The chemical reinforcement solution is presumed to be heated at 200 to 500° C.

The present inventors have carried out a still further investigation on the cause of the adhesion of fine iron powders, glass chips or stainless pieces to a glass substrate. As a result, it has been found that metal pieces such as iron powders generated from various manufacturing facilities or buildings installed around the chemical reinforcement apparatus are mixed in the chemical reinforcement liquid and they are adhered to a glass substrate during the chemical reinforcement of the glass substrate.

In a ninth aspect of the present invention, there is therefore provided a process for producing a glass substrate for an information recording medium, which comprises a step of chemically reinforcing a glass substrate by bringing it into contact with a chemical reinforcement liquid to substitute a portion of ions contained in said glass substrate by ions having a diameter larger than the former ions in said chemical reinforcement liquid, wherein a means for trapping fine particles existing in said chemical reinforcement liquid is provided.

In a tenth aspect of the present invention, there is also provided a process for producing a glass substrate for an information recording medium as described in the ninth aspect, wherein said means for trapping fine particles is a filter for filtering said chemical reinforcement liquid circulated.

In an eleventh aspect of the present invention, there is also provided a process for producing a glass substrate for an information recording medium as described in the ninth aspect, wherein said fine particles are fine iron powders and said trapping means is a magnet disposed to be in contact with said chemical reinforcement liquid.

As a chemical reinforcement method of the present invention, preferred is low-temperature type chemical reinforcement in which an ion exchange is performed in a region not exceeding the glass transition point. Examples of an alkali fusion salt used as a chemical reinforcement solution include potassium nitrate, sodium nitrate, and a mixture thereof.

Examples of the glass substrate usable in the present invention include aluminosilicate glass, soda-lime glass and crystallized glass.

As particles, metal pieces such as iron powders or stainless, metal oxides, glass chips and organic substance can be given as examples. The removal of such particles having a particle size of several microns or greater is effective for the process of the present invention.

Examples of the trapping means of the fine particles in the present invention include a filter. Any filters that can supply the filtered chemical reinforcement liquid can be employed. For example, a micro-sieve (a wire mesh having pores made by etching) can be used. In this case, the chemical reinforcement solution is heated at a high temperature so that the use of a martensitic or austenitic stainless alloy having excellent corrosion resistance is preferred.

As another means for trapping particles, a magnet or the like may be disposed so as to be in contact with the chemical reinforcement solution, in the case where the particles are fine iron powders.

The trapping means may be fixed or set movable.

The present inventors have carried out a further extensive investigation. As a result, it has been found that by washing the glass substrate with hydrochloric acid, foreign matters can be satisfactorily removed, particularly, iron contaminants dissolved therein can be removed effectively.

In the twentieth aspect of the present invention, there is therefore provided a process for producing a glass substrate for an information recording medium, said glass substrate having a principal surface subjected to precision polishing, which comprises a step of washing said glass substrate with hydrochloric acid.

In the thirteenth aspect of the present invention, there is also provided a process for producing a glass substrate for an information recording medium as described in the twentieth aspect, which comprises a step of chemically reinforcing a glass substrate by substituting a portion of ions contained in said glass substrate by ions having a diameter larger than the former ions, wherein said glass substrate is washed with hydrochloric acid as a pre-treatment or post-treatment step of the chemical reinforcement step.

In the present invention, by washing with hydrochloric acid, particularly iron contaminants dissolved therein can be removed effectively and also other foreign matters, for example, nickel, stainless, chromium, oxides or organic substance thereof can be removed. Washing with hydrochloric acid may be carried out between any two steps for the production of a glass substrate for an information recording medium but it is effectively carried out in one step or plural steps between the polishing step and packing step of the glass substrate completed. In the process for producing a glass substrate for an information recording medium including a chemical reinforcement step, when the step of washing with hydrochloric acid is carried out prior to the chemical reinforcement step, remaining of an unreinforced portion caused by foreign matters on the surface of the glass substrate can be prevented effectively. Alternatively, it is also possible to carry out the chemical reinforcement step and the step of washing off the fusion salt or the like in a clean booth or by the like method under an atmosphere where the air of a high cleanliness has been circulated and to carry out the step of washing with hydrochloric acid prior to packing of the glass substrate.

It is preferred to wash the whole portion of the glass substrate with hydrochloric acid but, the principal surface and the outer and inner peripheral sides of the glass substrate may be selectively washed in order to prevent under-layer defects and in order to prevent the transfer of the iron contaminants or the like, which has been adhered on the end face, to the principal surface, respectively. Examples of the washing method include dipping of a glass substrate in hydrochloric acid and spraying hydrochloric acid onto a glass substrate. Effects of washing with hydrochloric acid can be enhanced by applying supersonic waves during the washing with hydrochloric acid; or by scrub washing during or after washing with hydrochloric acid. As hydrochloric acid, 1-12N (N:Normality) dilute hydrochloric acid or concentrated hydrochloric acid is preferred. The temperature of hydrochloric acid is adjustable in the range of 30° C. to 60° C. as appropriate. The processing time of hydrochloric washing is adjustable in the range of 1 minute to 20 minutes as appropriate.

Specific examples of the glass substrate for an information recording medium include a glass substrate for a magnetic disk.

In the fourteenth aspect of the present invention, there is therefore provided a process for producing a glass substrate for an information recording medium as described in any one of the first, second, seventh, ninth and twelfth aspects, wherein said glass substrate for an information recording medium is a glass substrate for a magnetic disk.

In the fifteenth aspect of the present invention, there is also provided a process for producing a glass substrate for an information recording medium as described in the fourteenth aspect, wherein said glass substrate for a magnetic disk is a glass substrate for a magnetic disk for a magnetoresistive type head.

In the sixteenth aspect of the present invention, there is also provided a process for producing an information recording medium, which comprises forming at least a recording layer on a glass substrate obtained by the process for producing a glass substrate for an information recording medium as described in any one of the first, second, seventh, ninth and twentieth aspects.

In a seventeenth aspect of the present invention, there is also provided a process for producing an information recording medium as described in the sixteenth aspect, wherein said recording layer is a magnetic layer.

In the present invention, no particular limitation is imposed on the kind, size, thickness or the like of a glass substrate. Examples of the material quality of the glass substrate include aluminosilicate glass, soda-lime glass, soda aluminosilicate glass, aluminoborosilicate glass, borosilicate glass, quartz glass, chain silicate glass and glass ceramics such as crystallized glass.

As an aluminosilicate glass, preferred is a glass for chemical reinforcement which contains as principal components 62 to 75wt. % of $SiO_2$, 5 to 15wt. % of $Al_2O_3$, 4 to 10 wt. % of $Li_2O$, 4 to 12 wt. % of $Na_2O$ and 5.5 to 15 wt. % of $ZrO_2$; and wherein the weight ratio of $Na_2O$ to $ZrO_2$ is 0.5 to 2.0 and that of $Al_2O_3$ to $ZrO_2$ is 0.4 to 2.5.

It is preferred to use a glass for chemical reinforcement containing 57 to 74% of $SiO_2$, 0 to 2.8% of $ZrO_2$, 3 to 15% of $Al_2O_3$, 7 to 16% of $Li_2O$ and 4 to 14% of $Na_2O$, each in terms of mole %, in order to avoid the appearance of protrusions on the surface of the glass substrate which results from the undissolved substance of $ZrO_2$.

The aluminosilicate glass or the like having such a composition has increased bending strength, a deepened compression stress layer and improved Knoop hardness.

In the present invention, for the improvement of impact resistance and vibration resistance, chemical reinforcement treatment is applied to the surface of a glass substrate by the low-temperature ion exchange method.

No particular limitation is imposed on the chemical reinforcement method insofar as it is the chemical reinforcement method well known in the art. Preferred is low-temperature type chemical reinforcement in which ion exchange is effected in a temperature range not exceeding the glass transition point. Examples of the alkali fusion salt used for chemical reinforcement include potassium nitrate and sodium nitrate, and a mixture thereof.

The glass substrate for an information recording medium according to the process of the present invention can be used as a glass substrate for a magnetic recording medium, a glass substrate for an optical magnetic disk and a glass substrate for an electro-optical disk.

In particular, the glass substrate can be used suitably as a magnetic disk substrate for a magnetoresistive type head (including large-sized magnetoresistive type head) which carries out recording and reproduction and it can also be used suitably for a process for producing an information recording medium by using the substrate.

The magnetic recording medium of the present invention will hereinafter be described.

The magnetic recording medium of the present invention has at least a magnetic layer formed on the glass substrate for a magnetic recording medium according to the present invention.

Particles causing thermal asperity or head crash are not generated in the present invention so that protrusions, which will otherwise be formed by the particles, do not appear on the principal surface of the glass substrate at the time when a magnetic recording medium is produced by forming a magnetic layer on the glass substrate, whereby the prevention of a head crash on a still higher level can be attained. Particularly for a magnetic recording medium which carries out reproduction by a magnetoresistive type head, absence of protrusions makes it possible to fully exhibit the function of the magnetoresistive type head. Also for a CoPt type magnetic recording medium which is suitably used for a magnetoresistive type head, absence of protrusions makes it possible to fully exhibit the performance of the head.

Also on the recording or reproducing surface of the magnetic recording medium, no protrusion causing thermal asperity is formed, whereby the prevention of head crash on a still higher level can be effected.

Furthermore, since no particles which will cause thermal asperity are generated, neither defects in a film such a magnetic layer nor errors occur.

The magnetic recording medium is fabricated by stacking a primary layer, magnetic layer, protective layer and lubricating layer successively on a glass substrate for a magnetic disk which has a predetermined evenness and surface roughness and has a surface subjected to chemical reinforcement as needed.

The primary layer of the magnetic recording medium according to the present invention may be selected, depending on the magnetic layer stacked thereon.

Examples of the primary layer include those composed of at least one material selected from nonmagnetic metals such as Cr, Mo, Ta, Ti, W, V, B and Al. When the magnetic layer is composed mainly of Co, the primary layer is preferably formed of a single substance or alloy of Cr from the viewpoint of the improvement in the magnetic characteristics. The primary layer is not limited to a single layer but may be formed of plural layers of the same material or different materials. Examples of the multi-layered primary layer include Cr/Cr, Cr/CrMo, Cr/CrV, CrV/CrV, Al/Cr/CrMo, Al/Cr/Cr, Al/Cr/CrV and Al/CrV/CrV.

No particular limitation is imposed on the material of the magnetic layer in the magnetic recording medium of the present invention.

Examples of the magnetic layer include magnetic layers composed mainly of Co such as CoPt, CoCr, CoNi, CoNiCr, CoCrTa, CoPtCr, CoNiPt, CoNiCrPt, CoNiCrTa, CoCrTaPt and CoCrPtSiO. Alternatively, the magnetic layer may have a multi-layered structure (ex. CoPtCr/CrMo/CoPtCr, CoCrTaPt/CrMo/CoCrTaPt) which aims at a noise reduction by dividing the magnetic film by a nonmagnetic film (ex. Cr, CrMo, CrV).

Examples of the magnetic layer for a magnetoresistive type head (MR head) or giant magnetoresistive type head (GMR head) include Co alloys in which an impurity element selected from Y, Si, rare earth elements, Hf, Ge, Sn and Zn or an oxide of such an impurity element has been incorporated.

The magnetic layer may have a granular structure in which magnetic particles such as Fe, Co, FeCo or CoNiPt, have been dispersed in a non-magnetic layer formed of ferrite, iron—rare earth element, $SiO_2$ or BN. In addition, the recording system of the magnetic layer may be either an internal recording or a vertical recording system.

No particular limitation is imposed on the protective layer in the magnetic recording medium of the present invention.

Examples of the protective layer include Cr film, Cr alloy film, carbon film, zirconium film and silica film. The protective layer can be formed continuously with a primary layer and magnetic layer by an in-line sputtering apparatus. The protective layer may be a single layer or a multi-layer formed of the same material or different materials.

On the above-described protective layer or instead of the above-described protective layer, another protective layer may be formed in the present invention. For example, it is possible to disperse colloidal silica particles in a diluted solution of tetraalkoxysilane in an alcohol solvent and apply the resulting dispersion to a Cr film, followed by calcination, whereby a silicon oxide ($SiO_2$) film is formed instead of the above-described protective layer.

No particular limitation is imposed on the lubricating layer in the magnetic recording medium of the present invention.

The lubricating layer is formed, for example, by diluting perfluoropolyether (PFPE), which is a liquid lubricant, with a fluorene base solvent and applying the resulting diluted solution onto the surface of the medium by the dipping method, spin coating method or spraying method and optionally heating the coated surface.

BRIEF DESCRIPTION OF THE PREFERRED EMBODIMENTS

The present invention will hereinafter be described more specifically based on the examples.

EXAMPLE 1

(1) Rough Grinding Step

A glass substrate formed of an aluminosilicate glass cut from a sheet glass, which had been formed by the down-drawing method, into a disk having a diameter of 96 mmØ and a thickness of 3 mm by a grinding stone was ground by a comparatively rough diamond grinder into a disk having a diameter of 96 mmØ and a thickness of 1.5 mm.

Instead of the down-drawing method, it is possible to employ the direct pressing method to press a fused glass into a glass disk by using an upper mold, lower mold and cylindrical mold. Alternatively, the floating method may be used.

Incidentally, as the aluminosilicate glass, used was a glass for chemical reinforcement containing as principal components 57 to 74% of $SiO_2$, 0 to 2.8% of $ZnO_2$, 3 to 15% of $Al_2O_3$, 7 to. 16% of $Li_2O$ and 4 to 14 wt. % of $Na_2O$, each in terms of mole % (for example, a glass for chemical reinforcement containing as principal components 67.0% of $SiO_2$, 1.0% of $ZrO_2$, 9.0% of $Al_2O_3$, 12.0% of $Li_2O$ and 10.0% of $Na_2O$, each in terms of mole %).

Both sides of the glass substrate were ground by a diamond grinder having a particle size smaller than the above grinder, respectively. The load at that time was about 100 kg, by which both sides of the glass substrate were each formed to have a surface roughness of about 10 μm in terms of Rmax (as measured in accordance with JIS B 0601).

By using a cylindrical grinding stone, a hole was made at the center of the glass substrate and the outer peripheral end face was ground so that the glass substrate had a diameter of 95 mmØ. The outer peripheral end face and inner peripheral face were subjected to a predetermined chamfering treatment. The end face of the glass substrate at that time had a surface roughness of about 4 μm in terms of Rmax.

(2) Mirror-Finish Processing Step of End Face

While the glass surface was allowed to rotate, its end face was subjected to brush polishing to have a surface roughness of about 1 μm in terms of Rmax and about 0.3 μm in terms of Ra.

After the completion of the mirror-finish processing of the end face, the surface of the glass substrate was washed with water.

(3) Lapping Step

The glass substrate was then subjected to a lapping step. The lapping step aims at the improvement in the size accuracy and shape accuracy. The lapping was carried out twice by a lapping apparatus by changing the grain size of an abrasive from #400 to #1000.

Described specifically, with an alumina abrasive having a particle size of #400 at a load L of about 100 kg, both sides of the glass substrate placed in a carrier were lapped to have an areal accuracy of 0 to 1 μm and a surface roughness (Rmax) of 6 μm or so by allowing the inner gear and outer gear to rotate.

The lapping was then effected by changing the grain size of the alumina abrasive to #1000, whereby the surface roughness was improved to about 2 μm (Rmax).

After the completion of the lapping, the glass substrate was immersed and washed successively in the washing tanks of a neutral detergent and water.

(4) First Polishing Step

The glass substrate was then subjected to a first polishing step. The first polishing step was carried out by a polishing machine in order to remove the mars or distortions which had remained after the lapping step.

Described specifically, the first polishing step was carried out under the following polishing conditions by using a rigid polisher ("Cerium pad MHC15", trade name; product of Speed Pham) as a polisher (polishing powder).

Polishing liquid: cerium oxide+water

Load: 300 $g/cm^2$ (L=238 kg)

Polishing time: 15 minutes

Removed amount: 30 μm

Rotational speed of lower platen: 40 rpm

Rotational speed of upper platen: 35 rpm

Rotational speed of inner gear: 14 rpm

Rotational speed of outer gear: 29 rpm

After completion of the first polishing step, the glass substrate was immersed successively in the washing tanks of a neutral detergent, pure water, pure water, IPA (isopropyl alcohol) and IPA (vapor drying), whereby washing was carried out.

(5) Second Polishing Step

A second polishing step was carried out using a polishing machine employed in the first polishing step and a soft polisher ("Polirax", trade name; product of Speed Pham) instead of the rigid polisher. Polishing was conducted under the similar conditions to the first polishing step except that the load, polishing time and removed amount were changed to 100 $g/cm^2$, 5 minutes and 5 μm, respectively.

Steps subsequent to the second polishing step were carried out under an atmosphere where the air filtered through a clean booth was being circulated. Described specifically, all the steps after the second polishing step, that is, steps of washing, chemical reinforcement, washing-off of the chemical reinforcement solution, vapor drying and packing of the substrate were carried out under the environment whose air cleanliness permits the existence of particles of 2 to 4 μm in an amount of 800 particles per cubic foot.

After the completion of the second polishing step, the glass substrate was immersed and washed successively in the washing tanks of a neutral detergent, a neutral detergent, pure water, pure water, IPA (isopropyl alcohol) and IPA (vapor drying), respectively. Incidentally, supersonic waves were applied to each of the washing tanks.

(6) Chemical Reinforcement Step

After the completion of the grinding, polishing and washing steps, the glass substrate was subjected to chemical reinforcement.

The glass substrate which had been washed was heated in advance to 300° C. and immersed for about 3 hours in a chemical reinforcement solution preliminarily heated to 400° C., said solution having been prepared by mixing potassium nitrate (60%) and sodium nitrate (40%). With a view to applying the chemical reinforcement all over the surface of the glass substrate, the chemical reinforcement was effected with plural glass substrates being placed in a holder upon immersion so as to retain them at the end faces.

When the glass substrate is immersed in the chemical reinforcement solution, lithium ions and sodium ions on the surface layer of the glass substrate are substituted by sodium ions and potassium ions in the chemical reinforcement solution, respectively, whereby the glass substrate is reinforced.

The compression stress layer formed on the surface layer of the glass substrate had a thickness of about 100 to 200 After the completion of the chemical reinforcement, the glass substrate was quenched by immersing it in a water tank of 20° C. and kept it in the tank for about 10 minutes. The glass substrate was then subjected to vapor drying and surface inspection, followed by filling in a case, whereby the production steps were completed.

After the completion of the quenching, the glass substrate was immersed in sulfuric acid heated to about 40° C. Washing was effected, while supersonic waves were applied.

The principal surface of the glass substrate so obtained had a surface roughness Ra of 0.5 to 1 nm.

As a result of close examination of the glass surface, no particles which would be a cause for thermal asperity were observed. Described specifically, a glass substrate having a diameter of 65 mm was left alone for 30 minutes and then inspected by a laser-scatter type surface defect inspection instrument. As a result, the number of the particles was found to be 30 or less per micron. It is preferred that the particles of at least 5 μm have been removed from the surface of the glass substrate.

Incidentally, a glass substrate produced according to the conventional process contained several hundreds of particles, mainly iron powders, having a particle size of 10 to 100 micron.

(7) Fabrication Step of a Magnetic Disk

On both sides of the glass substrate for a magnetic disk obtained through the above steps, an AlN texture layer, Cr primary layer, CrMo primary layer, CoPtCrTa magnetic layer and C protective layer were formed successively by an in-line system sputtering apparatus, whereby a magnetic disk was obtained.

As a result of the grinding test on the magnetic disk so obtained, neither hit (light touch of the head with the surface of the magnetic disk) nor crash (collision of the head with the protrusion on the surface of the magnetic disk) was observed. It was also confirmed that no defects were caused in the film such as magnetic layer by the particles which would otherwise be a cause for thermal asperity. In the present example, a magnetic disk was thus fabricated in a high yield.

After the grinding test, the magnetic disk was subjected to a reproduction test by a magnetoresistive type head. As a result, a malfunction in the reproduction attributable to thermal asperity was not observed from each of the plural samples (500 disks).

EXAMPLE 2

On both sides of the glass substrate for a magnetic disk, which had been obtained in Example 1, were formed by an in-line sputtering apparatus a primary layer composed of Al (film thickness: 50 angstrom), Cr (1000 angstrom) and CrMo (100 angstrom); a magnetic layer composed of CoPtCr (120 angstrom), CrMo (50 angstrom) and CoPtCr (120 angstrom); and a protective layer composed of Cr (50 angstrom).

The resulting substrate was immersed in a solution of an organosilicon compound (a mixed solution of water, IPA and tetraethoxysilane) having fine silica particles (particle size: 100 angstrom) dispersed therein, followed by calcination, whereby a protective layer composed of $SiO_2$ and having a texture function was formed. The surface of the protective layer was then subjected to dip treatment with a lubricant composed of perfluoropolyether to form a lubricating layer thereon, whereby a magnetic disk for an MR head was obtained.

As a result of the grinding test on the magnetic disk so fabricated, neither hit nor crash was observed. It was also confirmed that no defect occurred in the film such as magnetic layer. As a result of the reproduction test by using a magnetoresistive type head, a malfunction in the reproduction attributable to thermal asperity was not observed.

Moreover, thermal asperity, which would otherwise occur during the use after a non-defective magnetic disk was installed in a magnetic disk driver, did not occur.

EXAMPLE 3

In a similar manner to Example 1 or Example 2 except that the primary layer was formed of Al, Cr and Cr and the magnetic layer was formed of CoNiCrTa, a magnetic disk for a thin-film head was fabricated.

The magnetic disc so obtained was confirmed to show the same results as in the above examples.

EXAMPLE 4

(1) Rough Grinding Step

A glass substrate formed of an aluminosilicate glass cut from a sheet glass, which had been formed by the down-drawing method, into a disk having a diameter of 96 mmØ and a thickness of 3 mm by a grinding stone was ground by a comparatively rough diamond grinder into a disk having a diameter of 96 mmØ and a thickness of 1.5 mm.

Instead of the down-drawing method, it is possible to employ the direct pressing method to press the fused glass into a glass disk by an upper mold, lower mold and cylindrical mold. Alternatively, floating method may be adopted for the formation of a glass disk.

Incidentally, as the aluminosilicate glass, used was a glass for chemical reinforcement containing as principal components 57 to 74% of $SiO_2$, 0 to 2.8% of $ZnO_2$, 3 to 15% of $Al_2O_3$, 7 to 16% of $Li_2O$ and 4 to 14 wt. % of $Na_2O$, each in terms of mole %, (for example, a glass for chemical reinforcement containing as principal components 67.0% of $SiO_2$, 1.0% of $ZnO_2$, 9.0% of $Al_2O_3$, 12.0% of $Li_2O$ and 10.0% of $Na_2O$, each in terms of mole %).

Both sides of the glass substrate were ground by a diamond grinder having a particle size smaller than the above grinder. The load at that time was about 100 kg, by which the both sides of the glass substrate were formed to have a surface roughness of about 10 μm in terms of Rmax (as measured in accordance with JIS B 0601).

By using a cylindrical grinding stone, a hole was made at the center of the glass substrate and the outer peripheral end face was ground to have a diameter of 95 mmØ. The outer peripheral end face and inner peripheral face were subjected to a predetermined chamfering treatment. The end face of the glass substrate at that time had a surface roughness of about 4 μm in terms of Rmax.

(2) Mirror-Finish Processing Step of End Face

While the glass surface was allowed to rotate, the end face of the glass substrate was subjected to brush polishing to a surface roughness of about 1 μm in terms of Rmax and about 0.3 μm in terms of Ra.

After the completion of the mirror-finish processing of the end face, the surface of the glass substrate was washed with water.

(3) Lapping Step

The glass substrate was then subjected to a lapping treatment. The lapping step aims at the improvement in the size accuracy and shape accuracy. The lapping was carried out by a lapping apparatus twice by changing the grain size of an abrasive from #400 and #1000.

Described specifically, with an alumina abrasive having a particle size of #400 at a load L of about 100 kg, both sides of the glass substrate placed in a carrier were lapped to have an areal accuracy of 0 to 1 μm and a surface roughness (Rmax) of 6 μm or so by allowing the inner gear and outer gear to rotate.

The lapping was then effected by changing the grain size of the alumina abrasive to #1000, whereby the surface roughness was improved to about 2 μm (Rmax).

After the completion of the lapping, the glass substrate was immersed and washed successively in the washing tanks of a neutral detergent and water.

(4) First Polishing Step

The glass substrate was then subjected to a first polishing step. The first polishing step was carried out by a polishing machine in order to remove the mars or distortions which had remained after the lapping step.

Described specifically, the first polishing step was carried out under the following polishing conditions by using a rigid polisher ("Cerium pad MHC15", trade name; product of Speed Pham) as a polisher (polishing powder).

Polishing liquid: cerium oxide+water

Load: 300 g/cm$^2$ (L=238 kg)

Polishing time: 15 minutes

Removed amount: 30 μm

Rotational speed of lower platen: 40 rpm

Rotational speed of upper platen: 35 rpm

Rotational speed of inner gear: 14 rpm

Rotational speed of outer gear: 29 rpm

After completion of the first polishing step, the glass substrate was immersed successively in the washing tanks of a neutral detergent, pure water, pure water, IPA (isopropyl alcohol) and IPA (vapor drying), whereby washing was carried out.

(5) Second Polishing Step

A second polishing step was carried out using a polishing machine employed in the first polishing step and a soft polisher ("Polirax", trade name; product of Speed Pham) instead of the rigid polisher. Polishing was conducted under the similar conditions to the first polishing step except that the load, polishing time and removed amount were changed to 100 g/cm$^2$, 5 minutes and 5 μm, respectively.

After the completion of the second polishing step, the glass substrate was immersed and washed successively in the washing tanks of a neutral detergent, a neutral detergent, pure water, pure water, IPA (isopropyl alcohol) and IPA (vapor drying), respectively. Incidentally, supersonic waves were applied to each of the washing tanks.

(6) Chemical Reinforcement Step

After the completion of the grinding, polishing and washing steps, the glass substrate was subjected to chemical reinforcement. The chemical reinforcement is carried out by pouring a chemical reinforcement solution into a chemical reinforcement tank and then immersing the glass substrate supported by a retaining member In the chemical reinforcement solution. Incidentally, the retaining member for the glass substrate is formed of three supports which form a plural number of V-grooves at equal intervals in the arranging direction of the glass substrate, said three supports being connected at each end face thereof with a connecting member. Each glass substrate is supported and retained at three points by the V-grooves in the same plane of three supports and plural glass substrates are arranged in the extending direction of these supports.

The supports and connecting members of the retaining member of this example are each formed of SUS316 which is an austenitic stainless alloy having excellent corrosion resistance in a high temperature region. The chemical reinforcement tank is, on the other hand, formed of SUS304 which is also an austenitic stainless alloy. The chemical reinforcement tank and retaining means may be formed of the same material or different materials. As another stainless alloy, SUS316L is suited, for example. The above stainless alloys (SUS316, SUS304, SUS316L) are defined by Japanese Industrial Standards (JIS G 4303-JIS G 4305).

Described specifically, the chemical reinforcement was carried out as follows. The glass substrate which had been washed was heated in advance to 300° C. and immersed in a chemical reinforcement solution preliminarily heated to 400° C. for about 3 hours, said solution having been prepared by mixing potassium nitrate (60%) and sodium nitrate (40%). With a view to applying the chemical reinforcement all over the surface of the glass substrate, the chemical reinforcement was effected with plural glass substrates being placed in a holder upon immersion so as to retain them at the end faces.

When the glass substrate is immersed in the chemical reinforcement solution, lithium ions and sodium ions on the surface layer of the glass substrate are substituted by sodium ions and potassium ions in the chemical reinforcement solution, respectively, whereby the glass substrate is reinforced.

The compression stress layer formed on the surface layer of the glass substrate had a thickness of about 100 to 200 μm. Upon chemical reinforcement, each of the chemical reinforcement tank and the retaining member for the glass substrate which was in contact with the hot chemical reinforcement solution was formed of an austenitic stainless alloy having excellent chemical durability so that adhesion of metal pieces such as iron powders or chromium and metal oxides to the glass substrate could be prevented.

After the completion of the chemical reinforcement, the glass substrate was quenched by dipping in a water tank of 20° C. and kept in it for about 10 minutes.

After the completion of the quenching, the glass substrate was immersed in sulfuric acid heated to about 40° C. It was washed, while supersonic waves were applied.

The principal surface of the glass substrate so obtained had a surface roughness Ra of 0.5 to 1 nm.

As a result of close examination of the glass surface, particles which would be a cause for thermal asperity were not observed. In particular, fine iron powders having a particle size of at least 3 to 5 μm were not observed at all.

(7) Fabrication Step of Magnetic Disk

On both sides of the glass substrate for a magnetic disk obtained through the above steps, an AlN texture layer, Cr primary layer, CrMo primary layer, CoPtCrTa magnetic layer and C protective layer were formed successively by an in-line system sputtering apparatus, whereby a magnetic disk was obtained.

As a result of the grinding test on the magnetic disk so obtained, neither hit nor crash was observed. It was also confirmed that no defects were caused in the film such as magnetic layer by the particles which would otherwise cause thermal asperity.

Incidentally, the present example wherein the tank and the retaining member in contact with the chemical reinforcement solution were each formed of a stainless alloy having high corrosion resistance was compared with a comparative example wherein the retaining member and tank were formed of a stainless alloy such as SUS430(ferrite base stainless alloy) having not so high corrosion resistance. As a result, in the comparative example, many fine iron powders having a particle size of 10 to 80 microns were observed on the surface of the glass substrate. Thus, the amount of foreign matters such as iron was markedly small in the present example.

After the grinding test, the magnetic disk of the present example was subjected to a reproduction test by using a magnetoresistive type head. As a result, a malfunction in reproduction attributable to thermal asperity was not observed from each of the plural samples (500 disks).

EXAMPLES 5 to 6

In a similar manner to Example 4 except for the use of a soda-lime glass (Example 5) or a soda aluminosilicate glass (Example 6) instead of the aluminosilicate glass, a glass substrate for a magnetic disk and a magnetic disk were fabricated.

As a result, a chemically reinforced glass having a surface free from metallic pieces such as iron powders was obtained as in Example 4.

In a similar manner to Example 4 except that as the material for the chemical reinforcement tank and retaining member, a martensitic stainless alloy was used instead of the austenitic stainless alloy, the glass substrate was subjected to chemical reinforcement. Same results were obtained as in the case of the austenitic stainless alloy.

EXAMPLE 7

On both sides of the glass substrate for a magnetic disk obtained in Example 4, formed were a primary layer composed of Al (film thickness: 50 angstrom), Cr (1000 angstrom) and CrMo (100 angstrom), a magnetic layer composed of CoPtCr (120 angstrom), CrMo (50 angstrom) and CoPtCr (120 angstrom) and a protective layer composed of Cr (50 angstrom).

The substrate so obtained was immersed in a solution of an organosilicon compound (a mixed solution of water, IP and tetraethoxysilane) having fine silica particles (particle size: 100 angstrom) dispersed therein, followed by calcination, whereby a protective layer composed of $SiO_2$ and having a texture function was formed. The surface of the protective layer was then subjected to dip treatment with a lubricant composed of perfluoropolyether to form a lubricating layer, whereby a magnetic disk for an MR head was obtained.

As a result of a grinding test on the magnetic disk so fabricated, neither hit nor crash was observed. It was also confirmed that no defects occurred in the magnetic layer or the like. As a result of the reproduction test by a magnetoresistive type head, a malfunction in reproduction attributable to thermal asperity was not observed.

EXAMPLE 8

In a similar manner to Example 7 except that the primary layer was formed of Al, Cr and Cr and the magnetic layer was formed of CoNiCrTa, a magnetic disk for a thin-film head was obtained.

The magnetic disk so obtained was confirmed to show the same results as in Example 7.

EXAMPLE 9

(1) Rough Grinding Step

A glass substrate formed of an aluminosilicate glass cut from a sheet glass, which had been formed by the down-drawing method, into a disk having a diameter of 96 mmØ and a thickness of 3 mm by a grinding stone was ground by a comparatively rough diamond grinder to a disk having a diameter of 96 mmØ and a thickness of 1.5 mm.

Instead of the down-drawing method, it is possible to employ the direct pressing method to press a fused glass into a glass disk by using an upper mold, lower mold and cyrindrical mold. Alternatively, the floating method may be used.

Incidentally, as the aluminosilicate glass, used was a glass for chemical reinforcement containing as principal components 57 to 74% of $SiO_2$, 0 to 2.8% of $ZnO_2$, 3 to 15% of $Al_2O_3$, 7 to 16% of $Li_2O$ and 4 to 14 wt. % of $Na_2O$, each in terms of mole %, (for example, a glass for chemical reinforcement containing as principal components 67.0% of $SiO_2$, 1.0% of $ZrO_2$, 9.0% of $Al_2O_3$, 12.0% of $Li_2O$ and 10.0% of $Na_2O$, each in terms of mole %).

The both sides of the glass substrate were ground by a diamond grinder having a particle size smaller than the above grinder, respectively. The load at that time was about 100 kg, by which the both sides of the glass substrate were each formed to have a surface roughness of about 10 μm in terms of Rmax (as measured in accordance with JIS B 0601).

By using a cylindrical grinding stone, a hole was made at the center of the glass substrate and the outer peripheral end face was ground so that the glass substrate had a diameter of 95 mmØ. The outer peripheral end face and inner peripheral face were subjected to a predetermined chamfering treatment. The end face of the glass substrate at that time had a surface roughness of about 4 μm in terms of Rmax.

(2) Mirror-Finish Processing Step of End Face

While the glass surface was allowed to rotate, its end face was subjected to brush polishing to have a surface roughness of about 1 μm in terms of Rmax and about 0.3 μm in terms of Ra.

After the completion of the mirror-finish processing of the end face, the surface of the glass substrate was washed with water.

(3) Lapping Step

The glass substrate was then subjected to a lapping step. The lapping step aims at the improvement in the size accuracy and shape accuracy. The lapping was carried out by a lapping apparatus twice by changing the grain size of an abrasive from #400 and #1000.

Described specifically, with an alumina abrasive having a particle size of #400 at a load L of about 100 kg, both sides of the glass substrate placed in a carrier were lapped to have an areal accuracy of 0 to 1 μm and surface roughness (Rmax) of 6 μm or so by allowing the inner gear and outer gear to rotate.

The lapping was then effected by changing the grain size of an alumina abrasive to #1000, whereby the surface roughness was improved to about 2 μm (Rmax).

After the completion of the lapping, the glass substrate was immersed and washed successively in the washing tanks of a neutral detergent and water.

(4) First Polishing Step

The glass substrate was then subjected to a first polishing step. The first polishing step was carried out by a polishing machine in order to remove the mars or distortions which had remained after the lapping step.

Described specifically, the first polishing step was carried out under the following polishing conditions by using a rigid polisher ("Cerium pad MHC15", trade name; product of Speed Pham) as a polisher (polishing powder).

Polishing liquid: cerium oxide+water
Load: 300 g/cm$^2$ (L=238 kg)
Polishing time: 15 minutes
Removed amount: 30 μm
Rotational speed of lower platen: 40 rpm Rotational speed of upper platen: 35 rpm Rotational speed of inner gear: 14 rpm Rotational speed of outer gear: 29 rpm After completion of the first polishing step, the glass substrate was immersed successively in the washing tanks of a neutral detergent, pure water, pure water, IPA (isopropyl alcohol) and IPA (vapor drying), whereby washing was carried out.

(2) Second Polishing Step

A second polishing step was carried out using a polishing machine employed in the first polishing step and a soft polisher ("Poliraxw", trade name; product of Speed Pham) instead of the rigid polisher. Polishing was conducted under the similar conditions to the first polishing step except that the load, polishing time and removal amount were changed to 100 g/cm$^2$, 5 minutes and 5 µm, respectively.

After the completion of the second polishing step, the glass substrate was immersed and washed successively in the washing tanks of a neutral detergent, a neutral detergent, pure water, pure water, IPA (isopropyl alcohol) and IPA (vapor drying), respectively. Incidentally, supersonic waves were applied to each of the washing tanks.

(6) Chemical Reinforcement Step

After the completion of the grinding, polishing and washing steps, the glass substrate was subjected to chemical reinforcement.

The chemical reinforcement is carried out by pouring a chemical reinforcement liquid into a chemical reinforcement tank and then dipping a retaining means having the glass substrate thereon in the chemical reinforcement tank. At this time, the liquid in the chemical reinforcement tank is being circulated by a pump and it is supplied to the treatment tank after filtered and cleaned through a filter of a stainless net which has a mesh of 1 micron or so and is disposed midway in the circulation route. The stainless net serving as a filter makes it possible to prevent the adhesion, onto the glass substrate, of iron powders or stainless pieces, which have been generated from the manufacturing facilities or buildings, floated in the atmosphere and then fallen in the chemical reinforcement tank, or glass chips generated by the scratch of the glass substrate.

The glass substrate under such conditions was subjected to chemical reinforcement as described below: The glass substrate washed and heated in advance to 300° C. was immersed for about 3 hours in a chemical reinforcement solution preliminarily heated to 400° C., said solution having been prepared by mixing potassium nitrate (60%) and sodium nitrate (40%). With a view to applying the chemical reinforcement all over the surface of the glass substrate, the chemical reinforcement was effected with plural glass substrates being placed in a holder upon immersion so as to retain them at the end faces.

When the glass substrate is immersed in a chemical reinforcement solution, lithium ions and sodium ions on the surface layer of the glass substrate are substituted by sodium ions and potassium ions in the chemical reinforcement solution, respectively, whereby the glass substrate is reinforced.

The compression stress layer formed on the surface layer of the glass substrate had a thickness of about 100 to 200 µm.

After the completion of the chemical reinforcement, the glass substrate was quenched by dipping in a water tank of 20° C. and kept in it for about 10 minutes.

After the completion of the quenching, the glass substrate was immersed in sulfuric acid heated to about 40° C. It was washed, while supersonic waves were applied.

The glass substrate so obtained had a surface roughness Ra of 0.5 to 1 nm.

As a result of close examination of the glass surface, particles which would be a cause for thermal asperity were not observed. In particular, iron powders having a particle size of at least 3 to 5 microns were not observed at all.

(7) Fabrication Step of Magnetic Disk

On both sides of the glass substrate for a magnetic disk obtained through the above steps, an AlN texture layer, Cr primary layer, CrMo primary layer, CoPtCrTa magnetic layer and C protective layer were formed successively by an in-line system sputtering apparatus, whereby a magnetic disk was obtained.

As a result of the grinding test on the magnetic disk so obtained, neither hit nor crash was observed. It was also confirmed that defects attributable to particles which would be a cause for thermal asperity were not generated in a magnetic layer or the like layer.

Incidentally, the grinding test was conducted for comparison on both the magnetic disk according to the present example obtained by chemical reinforcement with a clean chemical reinforcement solution and a magnetic disk according to comparative example obtained by chemical reinforcement without a trapping means. As a result, it has been found that the number of inferior disks was by far smaller in the case of the present example.

After the grinding test, the magnetic disk according to the present example was subjected to a reproduction test by using a magnetoresistive type head. As a result, a malfunction in the reproduction due to thermal asperity was not recognized in any of the 500 samples.

EXAMPLES 10–11

In Examples 10 and 11, in a similar manner to Example 9 except for the use of a soda-lime glass (Example 10) and a soda aluminosilicate glass (Example 11) instead of the aluminosilicate glass, glass substrates for a magnetic disk and magnetic disks were prepared, respectively.

As a result, they were confirmed to show the same results as in Example 9.

EXAMPLE 12

On both sides of the glass substrate for a magnetic disk which had been obtained in Example 9, were formed by an in-line sputtering apparatus a primary layer composed of Al (film thickness: 50 angstrom), Cr (1000 angstrom) and CrMo (100 angstrom), a magnetic layer composed of CoPtCr (120 angstrom), CrMo (50 angstrom) and CoPtCr (120 angstrom) and a protective layer composed of Cr (50 angstrom).

The resulting substrate was immersed in a solution of an organosilicon compound (a mixed solution of water, IPA and tetraethoxysilane) having fine silica particles (particle size: 100 angstrom) dispersed therein, followed by calcination, whereby a protective layer composed of SiO$_2$ and having a texture function was formed. The surface of the protective layer was subjected to dip treatment with a lubricant composed of perfluoropolyether to form a lubricating layer thereon, whereby a magnetic disk for an MR head was obtained.

As a result of the grinding test on the magnetic disk so fabricated, neither hit nor crash was observed. It was also confirmed that no defect was caused in the film such as magnetic layer. As a result of the reproduction test by using a magnetoresistive type head, a malfunction in the reproduction attributable to thermal asperity was not observed.

EXAMPLE 13

In a similar manner to Example 12 except for the use of an primary layer formed of Al, Cr and Cr and a magnetic layer formed of CoNiCrTa instead, a magnetic disk for a thin-film head was obtained.

The magnetic disk so obtained was confirmed to show the same results as in Example 12.

In the above example, a filter was employed as a means for trapping the particles in the chemical reinforcement liquid. Alternatively, it is possible to dispose a magnet or the like in the chemical reinforcement solution; or to dispose it in contact with an inner wall of the chemical reinforcement tank or bury it in the inner wall in order to trap only iron powders.

EXAMPLE 14

(1) Rough Grinding Step to A glass substrate formed of an aluminosilicate glass cut from a sheet glass, which had been formed by the down-drawing method, into a disk having a diameter of 66 mmØ and a thickness of 3 mm by a grinding stone was ground by a comparatively rough diamond grinder to a disk having a diameter of 66 mmØ and a thickness of 1.5 mm.

Instead of the down-drawing method, it is possible to employ the direct pressing method to press a fused glass into a glass disk by using an upper mold, lower mold and cylindrical mold. Alternatively, the floating method may be used.

Incidentally, as the aluminosilicate glass, used was a glass for chemical reinforcement containing as principal components 57 to 74% of $SiO_2$, 0 to 2.8% of $ZnO_2$, 3 to 15% of $Al_2O_3$, 7 to 16% of $Li_2O$ and 4 to 14 wt. % of $Na_2O$, each in terms of mole %, (for example, a glass for chemical reinforcement containing as principal components 67.0% of $SiO_2$, 1.0% of $ZnO_2$, 9.0% of $Al_2O_3$, 12.0% of $Li_2O$ and 10.0% of $Na_2O$, each in terms of mole %).

Both sides of the glass substrate were ground by a diamond grinder having a particle size smaller than the above grinder, respectively. The load at that time was about 100 kg, by which both sides of the glass substrate were each formed to have a surface roughness of about 10 μm in terms of Rmax (as measured in accordance with JIS B 0601).

By using a cylindrical grinding stone, a hole was made at the center of the glass substrate and the outer peripheral end face was ground so that the glass substrate had a diameter of 65 mmØ. The outer peripheral end face and inner peripheral face were subjected to a predetermined chamfering treatment. The end face of the glass substrate at that time had a surface roughness of about 4 μm in terms of Rmax.

(2) Mirror-Finish Processing Step of End Face

While the glass surface was allowed to rotate, its end face was subjected to brush polishing to have a surface roughness of about 1 μm in terms of Rmax and about 0.3 μm in terms of Ra.

After the completion of the mirror-finish processing of the end face, the surface of the glass substrate was washed with water.

(3) Lapping Step

The glass substrate was then subjected to a lapping step. The lapping step aims at the improvement in the size accuracy and shape accuracy. The lapping was carried out by a lapping apparatus twice by changing the grain size of an abrasive from #400 and #1000.

Described specifically, with an alumina abrasive having a particle size of #400 at a load L of about 100 kg, both sides of the glass substrate placed in a carrier were lapped to have an areal accuracy of 0 to 1 μm and a surface roughness (Rmax) of 6 μm or so by allowing the inner gear and outer gear to rotate.

The lapping was then effected by changing the grain size of an alumina abrasive to #1000, whereby the surface roughness was improved to about 2 μm (Rmax).

After the completion of the lapping, the glass substrate was immersed and washed successively in the washing tanks of a neutral detergent and water.

(4) First Polishing Step

The glass substrate was then subjected to a first polishing step. The first polishing step was carried out by a polishing machine in order to remove the mars or distortions which had remained after the lapping step.

Described specifically, the first polishing step was carried out under the following polishing conditions by using a rigid polisher ("Cerium pad MHC15", trade name; product of Speed Pham) as a polisher (polishing powder).

Polishing liquid: cerium oxide+water

Load: 300 g/cm² (L=238 kg)

Polishing time: 15 minutes

Removed amount: 30 μm

Rotational speed of lower platen: 40 rpm

Rotational speed of upper platen: 35 rpm

Rotational speed of inner gear: 14 rpm

Rotational speed of outer gear: 29 rpm

After completion of the first polishing step, the glass substrate was immersed successively in the washing tanks of a neutral detergent, pure water, pure water, IPA (isopropyl alcohol) and IPA (vapor drying), whereby washing was carried out.

(5) Second Polishing Step

A second polishing step was carried out using a polishing machine employed in the first polishing step and a soft polisher ("Polirax", trade name; product of Speed Pham) instead of the rigid polisher. Polishing was conducted under the similar conditions to the first polishing step except that the load, polishing time and removal amount were changed to 100 g/cm², 5 minutes and 5 μm, respectively.

After the second polishing step, the glass substrate was washed. Steps from the washing step to the step of packing in a case were carried out under an environment of the clean air supplied from a clean both. The glass substrate was immersed and washed successively in the washing tanks of a neutral detergent, a neutral detergent, pure water, pure water, IPA (isopropyl alcohol) and IPA (vapor drying). Incidentally, supersonic waves were applied to each of the washing tanks.

(6) Washing with Hydrochloric Acid

The glass substrate was then washed with hydrochloric acid to dissolve and remove fine iron contaminants adhered to the surface, inner peripheral face and outer peripheral surface of the glass substrate. Washing of a plural numbers of glass substrates supported was conducted by dipping in hydrochloric acid (hydrochloric acid : water=10 Kg : 43 liter) contained in the washing tank filtered and circulated by a 1.2 micron mesh type filter (about 10 minutes).

In this manner, iron contaminants are removed prior to the chemical reinforcement, whereby under-layer defects can be prevented. It is particularly important to carry out washing with hydrochloric acid prior to the chemical reinforcement. Because when the chemical reinforcement is carried out with iron contaminants being adhered on to the glass substrate, the surface portion of the glass substrate under the iron contaminants remains unreinforced and this unreinforced portion will become under-layer defects. The above-described washing with hydrochloric acid can prevent the generation of such under-layer defects.

(7) Chemical Reinforcement Step

After the washing step, the glass substrate was subjected to chemical reinforcement. The chemical reinforcement is carried out by pouring a chemical reinforcement liquid into a chemical reinforcement tank and then immersing the glass substrate supported by a retaining member in the chemical reinforcement liquid. Incidentally, the retaining member for the glass substrate is formed of three supports which form a plurality of V-grooves at equal intervals in the arranging direction of the glass substrate, said three supports being connected at each end face thereof with a connecting member. Each glass substrate is supported at three points by the V-grooves within the same plane of three supports and plural glass substrates are arranged in the extending direction of these supports.

The supports and connecting members of the retaining member of this embodiment are each formed of SUS316 which is an austenitic stainless alloy having excellent corrosion resistance in a high temperature region required upon chemical reinforcement. The chemical reinforcement tank is, on the other hand, formed of SUS304 which is also an austenitic stainless alloy. The chemical reinforcement tank and retaining means may be formed of the same material or different materials. As another stainless alloy, SUS316L is suited. The above stainless alloys (SUS316, SUS304, SUS316L) are defined by Japanese Industrial Standards (JIS G 4303-JIS G 4305). The chemical reinforcement liquid used in the present example is maintained clean because it is circulated through a filter.

Described specifically, the chemical reinforcement was carried out as follows. The glass substrate which had been washed was heated in advance to 300 ° C. and immersed for about 3 hours in a chemical reinforcement solution preliminarily heated to 400° C., said solution having been prepared by mixing potassium nitrate (60%) and sodium nitrate (40%). With a view to applying the chemical reinforcement all over the surface of the glass substrate, the chemical reinforcement was effected with plural glass substrates being placed in a holder upon immersion so as to retain them at the end faces.

When the glass substrate is immersed in the chemical reinforcement solution, lithium ions and sodium ions on the surface layer of the glass substrate are substituted by sodium ions and potassium ions in the chemical reinforcement solution, respectively, whereby the glass substrate is reinforced.

Since the compression stress layer formed on the surface layer of the glass substrate had a thickness of about 100 to 200 $\mu$m. The chemical reinforcement tank and the retaining member for the glass substrate, which were brought into contact with the hot chemical reinforcement liquid upon chemical reinforcement, were each formed of an austenitic stainless alloy having excellent chemical durability; and the chemical reinforcement liquid was circulated through a filter, adhesion of metal pieces such as iron powder or chromium and metal oxides to the glass substrate during the chemical reinforcement could be prevented.

After the completion of the chemical reinforcement, the glass substrate was quenched by dipping in a water tank of 20° C. and kept in it for about 10 minutes, whereby inferior products impaired with fine cracks can be removed.

(8) Washing and Packing Steps

After quenching, the glass substrate was immersed in sulfuric acid heated to about 140° C. and washed under the application of ultrasonic waves. By the above washing with sulfuric acid, the elution of alkali ions from the glass substrate can be prevented and besides, the precipitation salt on the glass substrate by the chemical reinforcement liquid can be removed. The glass substrate was then subjected to final washing, vapor drying and packing in a case.

After the above-described steps, the principal surface of the glass substrate had a surface roughness Ra of 0.5 to 1 nm.

As a result of close examination of the glass surface, particles which would be a cause for thermal asperity were not observed. In particular, fine iron powders having a particle size of at least 0.1 to 5 $\mu$m were not observed at all. In the present example, not only washing with hydrochloric acid but also cleanliness control of the environment and chemical reinforcement liquid was conducted to remove iron contaminants so that the iron contaminants could be removed almost completely.

Incidentally, washing with hydrochloric acid was conducted prior to the chemical reinforcement in the present example but it is also possible to carry out the washing subsequent to the chemical reinforcement or washing with sulfuric acid. Alternatively, washing with hydrochloric acid may be effected in all the steps prior to the chemical reinforcement, subsequent to the chemical reinforcement or subsequent to washing with sulfuric acid. It may be effected in plural steps selected in combination.

(9) Fabrication Step of Magnetic Disk

On both sides of the glass substrate for a magnetic disk obtained through the above steps, an AlN texture layer, Cr primary layer, CrMo primary layer, CoPtCrTa magnetic layer and C protective layer were formed successively by an in-line system sputtering apparatus, whereby a magnetic disk was obtained.

As a result of the grinding test on the magnetic disk so obtained, neither hit nor crash was observed. It was also confirmed that no defects were caused in the film such as magnetic layer by the particles which would otherwise cause thermal asperity.

Incidentally, the substrate, as obtained in the present example, from which iron contaminants had been removed by washing with hydrochloric acid and the substrate obtained in comparative example without hydrochloric acid treatment were compared. As a result, a number of fine iron powders having a particle size of 10 to 80 microns were observed on the surface of the glass substrate obtained in the comparative example. The superiority of the present example can be understood from the comparison in the results between the present example and comparative example.

After the grinding test, the magnetic disk was subjected to a reproduction test by using a magnetoresistive type head. As a result, a malfunction in the reproduction attributable to thermal asperity was not observed from each of the plural samples (500 disks).

EXAMPLES 15–16

In Examples 15 and 16, in a similar manner to Example 14 except for the use of soda-lime glass (Example 15) and soda aluminosilicate glass (Example 16) instead of the aluminosilicate glass, glass substrates for a magnetic disk and magnetic disks were obtained, respectively.

As a result, a chemically reinforced glass, similar to that obtained in Example 14, having a surface free from metallic pieces such as iron powders was obtained.

The kind of the glass was changed to acrystallized glass and the glass was washed with hydrochloric acid after polishing without chemical reinforcement and washing steps. In that case, similar effects were brought about for the removal of iron contaminants as in the above example.

EXAMPLE 17

On both sides of the glass substrate for a magnetic disk, which had been obtained in Example 14, were formed by an in-line sputtering apparatus a primary layer composed of Al (film thickness: 50 angstrom), Cr (1000 angstrom) and CrMo (100 angstrom); a magnetic layer composed of CoPtCr (120 angstrom), CrMo (50 angstrom) and CoPtCr (120 angstrom) and a protective layer composed of Cr (50 angstrom).

The resulting substrate was immersed in a solution of an organosilicon compound (a mixed solution of water, IPA and tetraethoxysilane) having fine silica particles (particle size: 100 angstrom) dispersed therein, followed by calcination, whereby a protective layer composed of $SiO_2$ and having a texture function was formed. The surface of the protective layer was subjected to dip treatment with a lubricant composed of perfluoropolyether to form a lubricating layer thereon, whereby a magnetic disk for an MR head was obtained.

As a result of the grinding test on the magnetic disk so fabricated, neither hit nor crash was observed. It was also confirmed that no defect appeared in the film such as magnetic layer. As a result of the reproduction test by using a magnetoresistive type head, a malfunction in the reproduction attributable to thermal asperity was not observed.

EXAMPLE 18

In a similar manner to Example 17 except that the primary layer was formed of Al, Cr and Cr and the magnetic layer was formed of CoNiCrTa, a magnetic disk for a thin-film head was fabricated.

The magnetic disk so obtained was confirmed to show the same results as that obtained in Example 17.

The present invention was described above by the preferred examples but it should however borne in mind that the present invention is not limited to or by the above examples. For example, the kind of the glass substrate or magnetic layer is not limited to those employed in the above examples.

As described above, a glass substrate for an information recording medium free from the adhesion of particles such as fine iron powders can be obtained according to the present invention. By forming an information recording layer and the like on the glass substrate so obtained, a high-quality information recording medium free from under-layer defects can be obtained.

What is claimed is:

1. A process for producing a glass substrate for an information recording medium, comprising the steps of:
   (a) polishing a principal surface of a glass substrate;
   (b) washing the polished glass substrate with hydrochloric acid;
   (c) following the washing step, chemically strengthening said glass substrate by immersing said glass substrate in a chemical reinforcement liquid and exchanging ions on the surface layer of said glass substrate with ions in said chemical reinforcement liquid having a diameter larger than that in said glass substrate;
   (d) cleaning the surface of said glass substrate with a cleaning agent;
   (e) drying the surface of said glass substrate;
   (f) inspecting the surface of said glass substrate; and
   (g) packing said glass substrate in a container;
   wherein at least one of the steps (b), (c), (d), (e), (f) and (g) is performed in an atmosphere in which a clean filtered air is circulated so as to prevent particles from being adhered on the surface of said glass substrate.

2. A process for producing a glass substrate for an information recording medium, comprising the steps of:
   (a) polishing a principal surface of a glass substrate;
   (b) washing the polished glass substrate with hydrochloric acid;
   (c) following the washing step, chemically strengthening said glass substrate by immersing said glass substrate in a chemical reinforcement liquid and exchanging ions on the surface layer of said glass substrate with ions in said chemical reinforcement liquid having a diameter larger than that in said glass substrate;
   (d) cleaning the surface of said glass substrate with a cleaning agent;
   (e) drying the surface of said glass substrate;
   (f) inspecting the surface of said glass substrate; and
   (g) packing said glass substrate in a container;
   wherein at least one of the steps (b), (c), (d), (e), (f) and (g) is performed under such an environmental condition that there exist not more than 1,000 particles per cubic foot having a size of 0.3 to 100 $\mu$m.

3. A process according to claim 1, wherein said clean filtered air has cleanliness permitting the existence of said particles having a size of 0.3 to 100 $\mu$m in an amount of not more than 1,000 particles per cubic foot.

4. A process according to claim 1, wherein said atmosphere has cleanliness permitting the existence of said particles in an amount of not more than 100 particles per cubic foot.

5. A process according to claim 2, wherein said environmental condition has cleanliness permitting the existence of said particles in an amount of not more than 100 particles per cubic foot.

6. A process according to claim 1, wherein said atmosphere has cleanliness permitting the existence of said particles in an amount of not more than 50 particles per cubic foot.

7. A process according to claim 2, wherein said environmental condition has cleanliness permitting the existence of said particles in an amount of not more than 50 particles per cubic foot.

8. A process according to claim 1, wherein the steps (b) and (c) are performed in said atmosphere.

9. A process according to claim 1, wherein the steps (b) and (c) are performed under said environmental condition.

10. A process for producing a glass substrate for an information recording medium, comprising the steps of:
    (a) preparing a chemical reinforcement tank in which a chemical reinforcement liquid is contained, and a holding means with which a glass substrate is held;
    (b) chemically strengthening said glass substrate by immersing said glass substrate in said chemical reinforcement liquid and exchanging ions on the surface of said glass substrate with ions in said chemical reinforcement liquid having a diameter larger than that in said glass substrate; and
    (c) providing in said tank a trapping means for trapping fine particles in said chemical reinforcement liquid.

11. A process according to claim 10, wherein said trapping means is a filter for filtering said chemical reinforcement liquid.

12. A process according to claim 10, wherein said fine particles are fine ion powder and said trapping means is a magnet disposed in contact with said chemical reinforcement liquid.

13. A process according to any one of claims 1, 2, and 10, wherein said glass substrate is a glass substrate for a magnetic disk.

14. A process according to claim 13, wherein said glass substrate for a magnetic disk is a glass substrate for a magnetic disk for a magnetoresistive type head.

15. A process according to any one of claims 1, 2, and 10, wherein said process further comprises a step of:

forming at least a recording layer on said substrate.

16. A process according to claim 15, wherein said recording layer is a magnetic layer.

* * * * *